United States Patent
Takenaka et al.

(10) Patent No.: US 6,553,868 B2
(45) Date of Patent: Apr. 29, 2003

(54) GEAR SUPPORTING STRUCTURE AND HYBRID DRIVING UNIT EMPLOYING GEAR SUPPORTING STRUCTURE

(75) Inventors: Masayuki Takenaka, Anjo (JP); Kazumasa Tsukamoto, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/942,870

(22) Filed: Aug. 31, 2001

(65) Prior Publication Data

US 2002/0029646 A1 Mar. 14, 2002

(30) Foreign Application Priority Data

Sep. 13, 2000 (JP) ........................................ 2000-278771

(51) Int. Cl.$^7$ ............................. B60K 6/02; F16H 1/08
(52) U.S. Cl. ...................... 74/665 B; 74/665 E; 74/432; 403/359.1
(58) Field of Search ............................ 74/665 E, 665 A, 74/665 B, 661, 431, 432, 421 R; 180/65.2; 403/359.1

(56) References Cited

U.S. PATENT DOCUMENTS

| 4,042,434 A | * | 8/1977 | Ivanko ........................ 156/145 |
| 4,509,381 A | * | 4/1985 | Ikemoto et al. ................ 29/525 |
| 4,721,002 A | * | 1/1988 | Horii ........................... 74/329 |
| 5,562,565 A | * | 10/1996 | Moroto et al. ............. 180/65.6 |
| 6,119,552 A | * | 9/2000 | Matsufuji ..................... 74/15.66 |
| 6,247,439 B1 | * | 6/2001 | Gokan et al. ............. 123/185.6 |
| 6,334,422 B1 | * | 1/2002 | Sumi et al. .............. 123/196 R |

FOREIGN PATENT DOCUMENTS

| JP | 8-183347 A | | 7/1996 |
| JP | 9-014360 A | * | 1/1997 |
| JP | 2001-97058 A | | 4/2001 |
| WO | WO 93/16302 A1 | * | 8/1993 |

OTHER PUBLICATIONS

U.S. patent application Ser. No. 09/731,918, Takenaka, filed Dec. 2000.*

* cited by examiner

Primary Examiner—Ankur Parekh
(74) Attorney, Agent, or Firm—Oliff & Berridge, PLC

(57) ABSTRACT

A gear supporting structure is designed to support two gears on a shaft with a short axial supporting span and without eccentricity or inclination. In this gear supporting structure wherein a first gear and a second gear are supported by a shaft in whirl-stopping and centering manners, the first gear with an axially extending boss portion is engaged with the shaft and fitted thereto in a centering manner at a whirl-stop portion and a first fitting portion, which are formed at different positions. A second fitting portion of the second gear is fitted to an outer periphery of the boss portion in a centering manner and connected with the first gear in a surface-fitting manner by a fastening device.

21 Claims, 2 Drawing Sheets

GEAR SUPPORTING STRUCTURE AND HYBRID DRIVING UNIT EMPLOYING GEAR SUPPORTING STRUCTURE

INCORPORATION BY REFERENCE

The disclosure of Japanese Patent Application No. 2000-278771 filed on Sep. 13, 2000, including the specification, drawings and abstract is incorporated herein by reference in its entirety.

BACKGROUND OF THE INVENTION

1. Field of Invention

The invention relates to a gear supporting structure for supporting two gears on a common shaft and application of the structure to a hybrid driving unit and, more particularly, to an art for reducing a span for supporting two gears on a shaft and shortening axial lengths of a gear supporting structure and a hybrid driving unit employing the gear supporting structure.

2. Description of Related Art

In a power transmission device wherein powers of different origins are transmitted from two driving sources to a common shaft via gears, it is typical to adopt a structure wherein two driven gears, that constitute a pair by meshing with drive gears drivingly connected with the driving sources respectively, are axially arranged and supported in a whirl-stopping (i.e. stopping the rotation of the gears) manner. Because such a structure necessitates a span corresponding to a width of at least two driven gears on the shaft side, a problem is caused if it is adopted in a power transmission device having a shaft with a limited axial length.

In view of the problem, there is another structure wherein two drive gears mesh with a common driven gear at circumferentially different positions to reduce a span of a shaft for supporting the driven gear. As an example in which such a structure is applied to a driving unit, there is an art disclosed in Japanese Patent Application Laid-Open No. HEI 8-183347. This driving unit is a hybrid driving unit employing an engine and a motor as power sources, and transmits powers of two different origins to wheels via a counter shaft. A counter driven gear (a third gear 32 as termed in the above-mentioned publication) is meshed with a drive gear drivingly connected with the engine side (a first gear 15 as termed in the above-mentioned publication) and a drive gear drivingly connected with the motor side (a second gear 27 as termed in the above-mentioned publication), so that each of the outputs from the engine and the motor is inputted to the counter shaft at an arbitrary gear ratio.

Requirements imposed on the engine in the hybrid driving unit as described above vary quite often depending on the vehicle type, e.g., whether importance is set on fuel consumption or acceleration. While a relatively high total gear ratio from the engine to the wheels needs to be set in the former case, a relatively low total gear ratio needs to be set in the latter case. In the conventional hybrid driving unit as described above, however, if an attempt has been made to change an engine-side total gear ratio in accordance with the requirements imposed on the vehicle, diameters of the engine-side drive gear and the counter driven gear are changed. In parallel with these changes, it is also inevitable to change a diameter of the motor-side drive gear that also meshes with the counter driven gear, thus, adversely affecting a motor-side total gear ratio.

Also, from the standpoint of gear noise, in a structure wherein the engine-side drive gear and the motor-side drive gear simultaneously mesh with the counter driven gear, since meshing orders (noise frequencies) are equal to each other, gear noise of a greater level is caused. In addition, it is impossible to determine from a discrepancy between noise frequencies whether a noise-causing meshing portion is between the counter driven gear and the engine-side drive gear or between the counter driven gear and the motor-side drive gear. Therefore, no measure can be used for noise reduction.

Thus, a method in which an engine-side counter driven gear and a motor-side counter driven gear are axially disposed in parallel can be used for a generally employed structure. In general, however, a power transmission device employs helical gears to ensure that tooth flanks continuously mesh with one another, and a moment load is applied to a gear supporting portion due to a thrust force applied to the tooth flanks. Thus, a portion (hub portion) for supporting the gears on the shaft is required to have a certain axial span to inhibit the gears from being inclined with respect to the shaft due to the moment load. The axial length of the counter shaft is thus increased because of a combined increase in the number of gears and a demand for the axial span. Consequently, the total length of the hybrid driving unit itself is also increased, thus, adversely affecting the mountability to the vehicle.

SUMMARY OF THE INVENTION

The invention has been made in view of the aforementioned circumstances. The invention thus provides a gear supporting structure that eliminates eccentricity and inclination of two gears with respect to a shaft while minimizing a span for supporting the gears on the shaft. The invention further provides a hybrid driving unit which easily varies the settings of an engine-side total gear ratio and a motor-side total gear ratio if the occasion demands, allows noise reduction measures to be taken and suppresses an increase in the axial length of the counter shaft.

To achieve the foregoing, according to a first exemplary aspect of the invention, there is provided a shaft, a first gear with a whirl-stop portion engaging the shaft, a first fitting portion fitted to the shaft and a boss portion extending axially, wherein the first gear is supported by the shaft in whirl-stopping and centering manners by engaging the whirl-stop portion with the shaft and fitting the first fitting portion to the shaft, and a second gear with a second fitting portion fitted to an outer periphery of the boss portion, wherein the second gear is supported by the first gear in a centering manner by fitting the second fitting portion to the outer periphery of the boss portion, is connected with the first gear in a whirl-stopping manner by a fastening device, and is supported by the shaft in whirl-stopping and centering manners via the first gear.

In the construction according to the first exemplary aspect of the invention, since the second gear is disposed in the boss portion of the first gear, the axial span of the second gear does not contribute to the elongation of the axial length of the shaft. Accordingly, the shaft is only required to have an axial length corresponding to the span of the boss portion. That is, there is no particular need to elongate the total length of the shaft in comparison with the construction of the related art. Further, since the boss portion allows a required axial span for suppressing the inclination of the gears, this structure is also advantageous from the standpoint of gear noise. Furthermore, the first fitting portion is regarded as a portion supported at its axial center by the shaft, and the whirl-stop portion is regarded as a portion for transmitting a torque to and from the shaft. In other words, the first fitting portion and the whirl-stop portion are clearly distinguished from each other. Thus, it is possible to improve supporting precision. The second gear is supported at its axial center by the boss portion of the first gear and connected therewith by the fastening device, whereby the second gear maintains a high degree of parallelization with respect to the first gear with a short span. As a whole, the compact arrangement can be achieved.

In the first exemplary aspect, the first fitting portion and the second fitting portion may be overlapped with each other radially with respect to an axis of the shaft.

In this construction, the first fitting portion of the first gear supported at its axial center by the shaft and the second fitting portion of the second gear supported at its axial center by the first fitting portion are overlapped with each other radially with respect to the axis of the shaft, whereby supporting precision therebetween is improved. Thus, both the gears can be ensured of a high axial supporting precision for the shaft.

In the first exemplary aspect, the structure may be provided with a first counter gear meshing with the first gear and a second counter gear meshing with the second gear, wherein the second gear and the second counter gear may be helical gears having helical teeth that are twisted in such a direction that a thrust force applied to the second gear acts as a pressing force applied to the first gear when a torque is transmitted from the second gear to the shaft via the first gear with the second counter gear on the driving side.

In this construction, it is possible to reduce a load applied to the fastening device at the time of driving and thus extend a life span of the fastening device.

According to a second exemplary aspect of the invention, there is provided a a hybrid driving unit comprising an engine-side drive gear drivingly connected with an engine, a motor-side drive gear drivingly connected with a motor, a counter shaft drivingly connected with wheels, an engine-side counter driven gear that meshes with the engine-side drive gear, that is supported by the counter shaft in whirl-stopping and centering manners, and that transmits power from the engine to the counter shaft, a motor-side counter driven gear that meshes with the motor-side drive gear, that is supported by the counter shaft in whirl-stopping and centering manners, and that transmits power from the motor to the counter shaft, and an axially extending boss portion formed in one of the counter driven gears with the other counter driven gear supported by the boss portion in whirl-stopping and centering manners and supported by the counter shaft in whirl-stopping and centering manners via the one of the counter driven gears.

In the construction according to the second exemplary aspect of the invention, since the other counter driven gear is disposed in the boss portion of the one of the counter driven gears, the axial span of the other counter driven gear does not contribute to the elongation of the axial length of the shaft. Accordingly, the shaft is only required to have an axial length corresponding to the span of the boss portion, and it is only the axial length of the boss portion that is relevant to the axial length of the shaft. Thus, there is no need to elongate the total length of the hybrid driving unit in comparison with the construction of the related art. Further, since the boss portion allows a required axial span for suppressing inclination of the gears, this hybrid driving unit is also advantageous from the standpoint of gear noise.

In the second exemplary aspect, the one of the counter driven gears may have a whirl-stop portion engaging the counter shaft and a first fitting portion fitted to the counter shaft, and may be supported by the counter shaft in whirl-stopping and centering manners by engaging the whirl-stop portion with the counter shaft and fitting the first fitting portion to the counter shaft.

In this construction, the first fitting portion is regarded as a portion supported at its axial center by the shaft, and the whirl-stop portion is regarded as a portion for transmitting a torque to and from the shaft. In other words, the first fitting portion and the whirl-stop portion are clearly distinguished from each other, thus improving supporting precision.

In the second exemplary aspect, the other counter driven gear may have a second fitting portion fitted to an outer periphery of the boss portion of the one of the counter driven gears, may be supported by the one of the counter driven gears in a centering manner by fitting the second fitting portion to the outer periphery of the boss portion, may be connected with the one of the counter driven gears in a whirl-stopping manner by a fastening device, and may be supported by the counter shaft in whirl-stopping and centering manners via the one of the counter driven gears.

In this construction, the other counter driven gear is supported at its axial center by the boss portion, whereby the other counter driven gear can be ensured of a high degree of supporting precision with a short span. As a whole, compact arrangement can be achieved.

In the second exemplary aspect, the first fitting portion and the second fitting portion may be overlapped with each other radially with respect to an axis of the counter shaft.

In this construction, the first fitting portion of the one of the counter driven gears supported at its axial center by the counter shaft and the second fitting portion of the other counter driven gear supported at its axial center by the first fitting portion are overlapped with each other radially with respect to the axis of the shaft, whereby supporting precision therebetween is improved. Thus, both the gears can be ensured of a high axial supporting precision for the counter shaft.

In the second exemplary aspect, the hybrid driving unit may be installed in a vehicle, and the other counter driven gear and the drive gear meshing therewith may be helical gears having helical teeth that are twisted in such a direction that a thrust force applied to the other counter driven gear acts as a pressing force applied to the one of the counter driven gears during power running of the vehicle.

In this construction, because a greater load resulting from torque transmission is applied to the other counter driven gear during power running than during regeneration while the vehicle is running, the burden imposed on the fastening device can be reduced on the side of a greater load. Thus, it is possible to extend a life span of the fastening device.

In the second exemplary aspect, the one of the counter driven gears may be the motor-side counter driven gear, and the other counter driven gear may be the engine-side counter driven gear.

In this construction, the engine-side counter driven gear is disposed in the boss portion of the motor-side counter driven gear. Even if the requirements imposed on the vehicle vary e.g. depending on whether importance is set on fuel consumption or acceleration, nothing more than the replacement of the engine-side counter driven gear is required. Therefore, the number of variations of the driving unit can be easily increased. Further, from the standpoint of a torque inputted to the counter shaft, the torque from the motor side is also greater than the torque from the engine side during power running of the vehicle. Further, since the torque during regeneration by the motor is also inputted, the motor-side counter driven gear that requires high precision is given priority and supported on the counter shaft directly, whereas the engine-side counter driven gear is supported on the counter shaft indirectly via the boss portion. Thus, it is possible to adopt a supporting mode depending on a torque load.

BRIEF DESCRIPTION OF THE DRAWINGS

Various embodiments of the invention will be described with reference to the following figures, wherein.

DETAILED DESCRIPTION OF PREFERRED EMBODIMENTS

Figure 1:
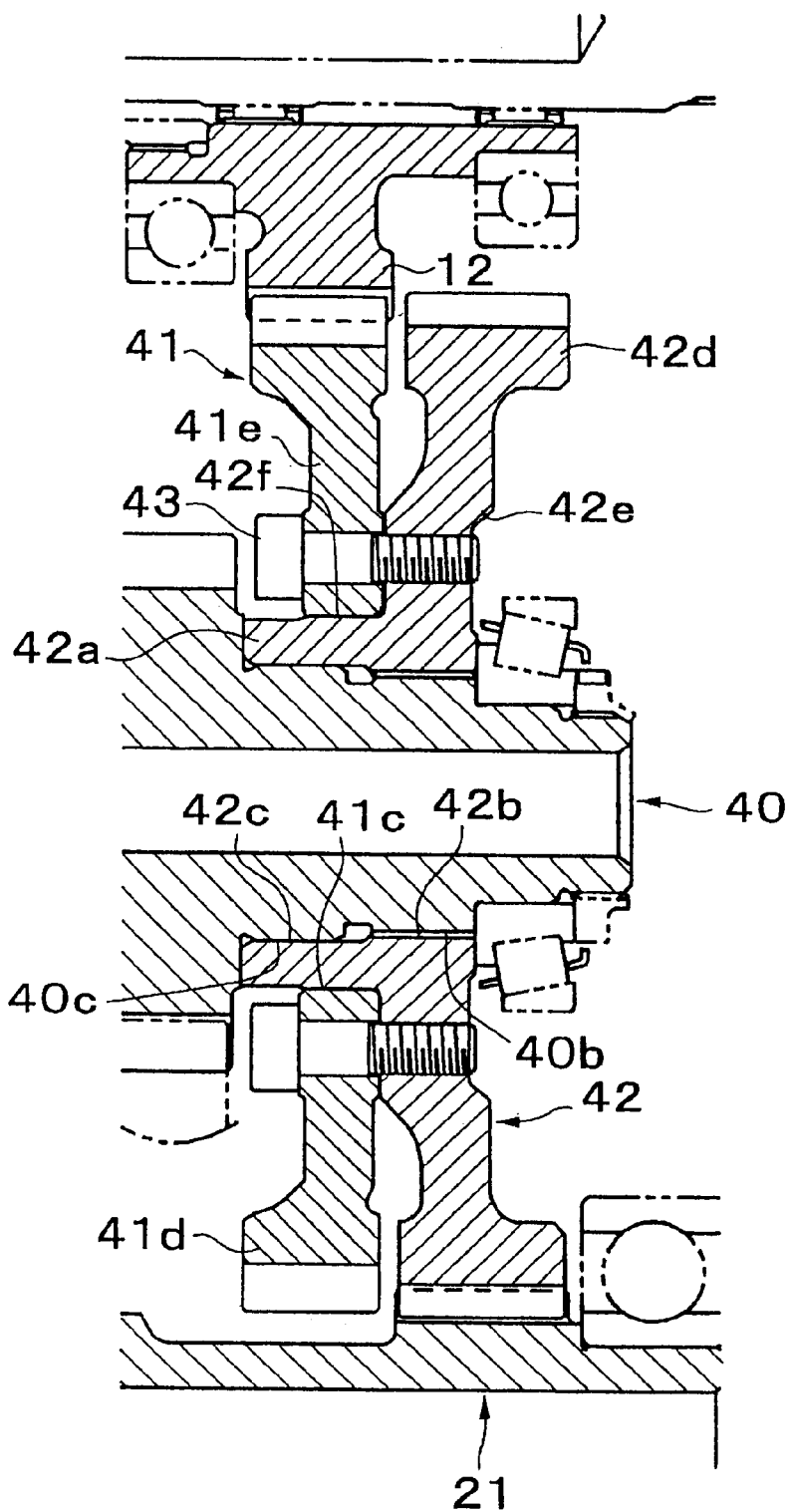
FIG. 1 is an axial cross-sectional view of a gear supporting structure according to a first embodiment of the invention.

Hereinafter, embodiments of the invention will be described with reference to the drawings. FIG. 1 is an axial cross-sectional view of a power transmission mechanism to which a gear supporting structure according to one embodiment of the invention is applied. This power transmission mechanism is composed of a shaft 40, a first gear 42 and a second gear 41. The first and second gears 42, 41 are supported by the shaft 40 in whirl-stopping (i.e., stopping the rotation of the gears) and centering manners. The first gear 42 has a whirl-stop portion 42b engaging the shaft 40 and a first fitting portion 42c fitted to the shaft 40, and also has a boss portion 42a extending in the axial direction. Further, the second gear 41 has a second fitting portion 41c fitted to an outer periphery of the boss portion 42a. By engaging the whirl-stop portion 42b with the shaft 40 and fitting the first fitting portion 42c to the shaft 40, the first gear 42 is supported by the shaft 40 in whirl-stopping and centering manners. By fitting the second fitting portion 41c to the outer periphery of the boss portion 42a, the second gear 41 is supported by the first gear 42 in a centering manner. Also, the second gear 41 is connected with the first gear 42 by a fastening device 43 in a whirl-stopping manner, and is supported by the shaft 40 via the first gear 42 in whirl-stopping and centering manners. Furthermore, the first fitting portion 42c and the second fitting portion 41c are overlapped with each other radially with respect to the axis of the shaft 40.

The power transmission mechanism is further provided with a first counter gear 21 meshing with the first gear 42 and a second counter gear 12 meshing with the second gear 41. The second gear 41 and the second counter gear 12 are helical gears having helical teeth that are twisted in such a direction that a thrust force applied to the second gear 41 acts as a pressing force applied to the first gear 42 when a torque is transmitted from the second gear 41 to the shaft 40 via the first gear 42 with the second counter gear 12 on the driving side.

To be more specific, the shaft 40 has a cylindrical surface (hereinafter referred to as an outer peripheral spline) 40b with spline teeth and a smooth cylindrical surface (hereinafter referred to as an outer peripheral fitting surface) 40c. The outer peripheral spline 40b and the outer peripheral fitting surface 40c are axially arranged on the outer periphery of the shaft 40. The outer peripheral spline 40b constitutes a whirl-stop portion engaging the whirl-stop portion 42b of the first gear 42. The outer peripheral fitting surface 40c constitutes a centering portion that cooperates through the fitting of the first gear 42 to the first fitting portion 42c.

The first gear 42 is provided with a rim portion 42d with meshing teeth on the outer peripheral side, the boss portion 42a extending axially on the inner peripheral side, and a staged radial flange portion 42e connecting the rim portion 42d with the boss portion 42a. An inner peripheral surface of the boss portion 42a has a staged hole with a small-diameter portion and a large-diameter portion. The small-diameter portion has spline teeth on its inner peripheral surface. The large-diameter portion has an inner peripheral surface that is a smooth cylindrical surface (hereinafter referred to as an inner peripheral fitting surface). The inner peripheral surface on which the spline teeth are formed (hereinafter referred to as an inner peripheral spline) constitutes the whirl-stop portion 42b engaging the outer peripheral spline 40b of the shaft 40. The inner peripheral fitting surface constitutes the first fitting portion 42c fitted to the outer peripheral fitting surface 40c of the shaft 40. An outer peripheral surface of the boss portion 42a is a staged cylindrical surface. A large-diameter cylindrical surface adjacent to the radial flange portion 42e is an outer peripheral fitting surface 42f cooperating with the second fitting portion 41c of the second gear 41. Further, a flank of the radial flange portion 42e on the side of an elongation of the boss portion 42a is an abutment surface where the second gear 41 abuts on a later-described radial flange portion 41e. In the embodiment shown in the drawing, the first gear 42 has a tip of the boss portion 42a abutting on a staged surface of the shaft 40 and a lateral end surface of the flange portion 42e abutting on an inner race of a bearing. By pressing the inner race by fastening a nut screwed onto the shaft 40, the first gear 42 is axially fixed to the shaft 40.

The second gear 41 is provided with a rim portion 41d with meshing teeth on the outer peripheral side and the radial flange portion 41e extending radially inwardly therefrom. An inner peripheral surface of the radial flange portion 41e is a smooth cylindrical surface (hereinafter referred to as an inner peripheral fitting surface). This inner peripheral fitting surface constitutes the second fitting portion 41c fitted to the outer peripheral fitting surface 42c of the boss portion 42a of the first gear 42. Further, a flank of the radial flange portion 41e facing the radial flange portion 42f of the first gear 42 is an abutment surface where the second gear 41 abuts on the first gear 42. Furthermore, the meshing teeth formed on the rim portion 41d are helical teeth having tooth flanks twisted with respect to the axis. This twisting direction is a counterclockwise direction on the assumption that the counter gear 12 rotates clockwise when viewed from the right-hand side in the drawing. Thus, the meshing teeth receive a thrust force in the direction toward the first gear 42 (to the right in the drawing) due to a tangential force received from the tooth flank of the counter gear 12 when power is transmitted with the counter gear 12 on the driving side and the second gear 41 on the driven side.

The fastening device 43 is a bolt screwed into a threaded hole in the first gear 42 through a through-hole in the second gear 41. By fastening the bolt, the second gear 41 is connected with the first gear 42 in a whirl-stopping manner, and both the gears are held in position in the direction perpendicular to the axis with their radial flange portions surface-fitted to each other.

Thus, in this gear supporting structure, the first gear 42 is centered with respect to the shaft 40 at the first fitting portion 42c that guarantees a high processing precision by being differently positioned from the whirl-stop portion 42b.

Owing to a sufficient span of a hub portion 42a, the first gear 42 is fixed to the shaft 40 without being inclined with respect thereto. The second gear 41 is fitted to the outer peripheral fitting surface 42f in a centering manner. The outer peripheral fitting surface 42f guarantees a high processing precision and is on the outer periphery of the boss portion 42a of the first gear 42 fixed as described above. The second gear 41 is fixed in a surface-fitting manner to the flank of the first gear 42 using a bolt, whereby the second gear 41 maintains a high degree of concentricity and parallelization with respect to the first gear 42. As a result, the supporting precision of the gears 41, 42 with respect to the shaft 40 can be enhanced while the second gear 41 is supported on the shaft 40 via the first gear 42. Further, since the second gear 41 allows a high degree of parallelization with respect to the first gear 42 by being fixed thereto in a surface-fitting manner, the second gear 41 can have a span within a span of the boss portion 42a of the first gear 42. The necessity to provide an axial span for preventing inclination with respect to the shaft 40 can be substantially eliminated.

Next, a second embodiment in which the gear supporting structure of the invention is applied to a transversely-mounted hybrid driving unit for front-engine front-drive (FF) vehicles will be described. In the following description, since the construction of the gear supporting structure itself is the same as that of the first embodiment, corresponding components will be denoted by the same reference numerals and reference will be made to FIG. 1 to describe a detailed construction of the second embodiment.

Figure 2:
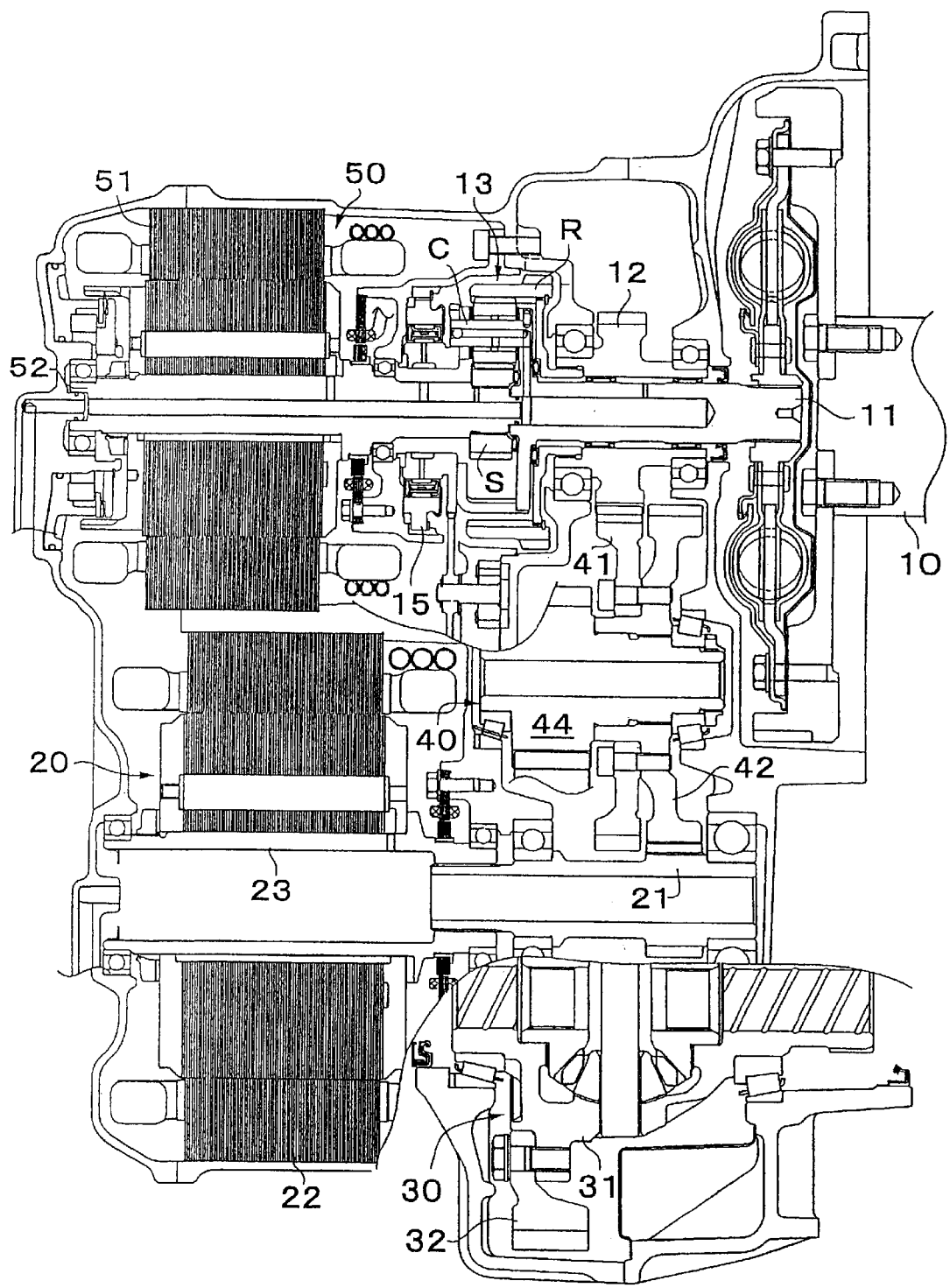
FIG. 2 is an axial cross-sectional view of a hybrid driving unit according to a second embodiment of the invention.

As is apparent from an axial cross-section shown in FIG. 2, this unit has a four-shaft structure. An engine 10 is disposed on a first shaft although only a rear end of a crank shaft is shown. A motor 20 is disposed on a second shaft that is different from the first shaft. The engine 10 and the motor 20 are two separate power sources. Furthermore, a generator 50 is disposed on the first shaft. A differential 30 is disposed on a third shaft although only a part of the differential 30 is shown. A counter shaft 40 is also provided as still another shaft. The engine 10 and the generator 50 are drivingly connected with each other and with the counter shaft 40 via a single-pinion-type planetary gear 13 constituting a differential gear unit. The motor 20 is directly drivingly connected with the counter shaft 40. The counter shaft 40 is drivingly connected with wheels (not shown) via the differential 30.

As a mechanism for transmitting power from the engine 10 and the motor 20, the hybrid driving unit constructed as described above is provided with an engine-side drive gear 12, a motor-side drive gear 21, the counter shaft 40, an engine-side counter driven gear 41, and a motor-side counter driven gear 42. The engine-side drive gear 12 is drivingly connected with the engine 10. The motor-side drive gear 21 is drivingly connected with the motor 20. The counter shaft 40 is drivingly connected with the wheels. The engine-side counter driven gear 41 is supported by the counter shaft 40 in whirl-stopping and centering manners, and transmits power from the engine 10 to the counter shaft 40. The motor-side counter driven gear 42 meshes with the motor-side drive gear 21, is supported by the counter shaft 40 in whirl-stopping and centering manners, and transmits power from the motor 20 to the counter shaft 40.

In the power transmission mechanism described above, according to the invention, the axially extending boss portion 42a is formed on one of the counter driven gears, i.e., the counter driven gear 42. The other counter driven gear 41 is supported by the boss portion 42a in whirl-stopping and centering manners, and is supported by the counter shaft 40 via the counter driven shaft 42 in whirl-stopping and centering manners. The counter driven gear 42 has the whirl-stop portion 42b engaging the counter shaft 40 and the first fitting portion 42c fitted to the counter shaft 40. By engaging the whirl-stop portion 42b with the counter shaft 40 and fitting the first fitting portion 42c to the counter shaft 40, the counter driven gear 42 is supported by the counter shaft 40 in whirl-stopping and centering manners. Concrete constructions of the whirl-stop portion 42b and the first fitting portion 42c are the same as those of the first embodiment.

The counter driven gear 41 has the second fitting portion 41c fitted to the outer periphery of the boss portion 42a of the counter driven gear 42. By fitting the second fitting portion 41c to the outer periphery of the boss portion 42a, the counter driven gear 41 is supported by the counter driven gear 42 in a centering manner. Also, the counter driven gear 41 is connected with the counter driven gear 42 by the fastening device 43 in a whirl-stopping manner. Thus, the counter driven gear 41 is supported by the counter shaft 40 via the counter driven gear 42 in whirl-stopping and centering manners. Concrete constructions of the second fitting portion 41c of the counter driven gear 41 and the fastening device 43 are also the same as those of the first embodiment. In the second embodiment, the counter driven gear 42 is a motor-side counter driven gear, and the counter driven gear 41 is an engine-side counter driven gear. The reason for making such a selection will be described later in detail. Further, the engine-side counter driven gear 41 and the engine-side drive gear 12 meshing therewith are helical gears having helical teeth that are twisted in such a direction that a thrust force applied to the engine-side counter driven gear 41 acts as a pressing force applied to the motor-side counter driven gear 42 during power running of the vehicle.

An output shaft 11 connected with the crank shaft of the engine 10 via a drive plate is connected with a carrier C of the planetary gear 13. The generator 50 is disposed with a stator 51 fitted to a peripheral wall of a case in a whirl-stopping manner. A rotor shaft 52 of the generator 50 is connected with a sun gear S of the planetary gear 13. A ring gear R of the planetary gear 13 is connected with the engine-side drive gear 12 rotatably supported by an outer periphery of the output shaft 11. The ring gear R is connected with the case via a one-way clutch 15, and is prevented from rotating reversely.

The motor 20 is disposed with a stator 22 fitted to the peripheral wall of the case in a whirl-stopping manner. A rotor shaft 23 of the motor 20 is connected with the motor-side drive gear 21.

The differential 30, drivingly connecting the counter shaft 40 with the wheels, is provided with a differential ring gear 32 fixed to a differential case 31. The differential ring gear 32 meshes with a differential drive pinion gear 44 integrated with the counter shaft 40.

In the hybrid driving unit constructed as described above, while the motor 20 and the wheels (not shown) are connected with each other directly in terms of power transmission, the engine 10 and the generator 50 are connected with each other and with the counter shaft 40 via the planetary gear 13 indirectly in terms of power transmission. Thus, if the generator 50 is rotated idly with an output of the motor 20 in a stopped state of the engine 10, the vehicle can run in its motor mode. Further, if a generation load of the generator 50 is adjusted for the ring gear R that receives a running load of the vehicle via the differential 30 and the counter shaft 40 in a simultaneous output state of the engine 10 and the motor 20, the vehicle can run while using an engine output as a driving force and generating energy (charging of a battery) at a suitably adjusted ratio. Further, if the generator 50 is driven as an electric motor, a counterforce applied to the carrier C is inverted. Thus, if the carrier C is engaged with the case by the one-way clutch 15 at this moment, an output from the generator 50 can be transmitted to the ring gear R. Thus, amplification of a driving force during take-off of the vehicle (parallel mode running) is made possible by simultaneous outputs from the motor 20 and the generator 50.

If torques inputted to the counter shaft 40 are observed from the standpoint of a driving relationship as described above, the torque from the motor 20 is greater than the torque from the engine 10 during power running of the vehicle. Further, torque transmission by the motor 20 during regeneration is also relevant. Therefore, when giving priority to a shaft supporting precision of the gear with a greater torque load, the motor-side counter driven gear 42 is directly supported by the counter shaft 40, and the engine-side counter driven gear 41 is indirectly supported by the counter shaft 40 via the boss portion 42a of the motor-side counter driven gear 42.

Further, a greater load is applied to the engine-side counter driven gear 41 when a torque is transmitted during power running based on the driving of the engine or the generator than when the counter driven gear 41 is driven (regenerated) by the wheels while the vehicle is running. Therefore, when reducing a burden imposed on the fastening device 43, a thrust force is made to act on the motor-side counter driven gear 42 during power running of the vehicle so that the fastening device 43 is ensured of an extended life span.

Furthermore, because of the application to such a driving unit, meshing diameters of the driven gears 41, 42 and the drive gears 12, 21 corresponding thereto can be changed individually. Thus, the engine-side gear ratio can be easily changed without changing the motor-side gear ratio. Moreover, the engine-side driven gear 41 and the motor-side driven gear 42 are separate from each other and thus different in meshing order from each other. Therefore, even if gear noise has been caused, it is possible to easily determine from a discrepancy between noise frequencies whether a noise-causing meshing portion is between the counter driven gear and the engine-side drive gear or between the counter driven gear and the motor-side drive gear. Thus, measures for noise reduction can be easily taken.

Effects achieved by the gear supporting structure itself in this driving unit are self-evident from a correspondence between the shaft of the first embodiment and the counter shaft of the second embodiment, between the first gear and the motor-side counter driven gear 42, and between the second gear and the engine-side counter driven gear 41, and thus will not be described.

Although the transversely-mounted driving unit for FF vehicles has been described as an example of application of the invention, the invention can be widely applied to general-purpose power transmission devices. The construction of the gear supporting structure itself can also be modified concretely and in various manners within the scope defined by claims.

What is claimed is:

1. A gear supporting structure, comprising:
   a shaft;
   a first gear with a whirl stop portion engaging the shaft, a first fitting portion fitted to the shaft and a boss portion extending axially, wherein the first gear is supported by the shaft in whirl stopping and centering manners by engaging the whirl stop portion with th shaft and fitting the first fitting portion to the shaft;
   a second gear with a second fitting portion fitted to an outer periphery of the boss portion, wherein the second gear is supported by the first gear in a centering manner by fitting the second fitting portion to the outer periphery of the boss portion, is connected with the first gear in a whirl stopping manner by a fastening device, and is supported by the shaft in whirl stopping and centering manners via the first gear;
   a first counter gear meshing with the first gear; and
   a second counter gear meshing with the second gear.

2. A gear supporting structure, comprising:
   a shaft;
   a first gear with a whirl stop portion engaging the shaft, a first fitting portion fitted to the shaft and a boss portion extending axially, wherein the first gear is supported by the shaft in whirl stopping and centering manners by engaging the whirl stop portion with the shaft and fitting the first fitting portion to the shaft; and
   a second gear with a second fitting portion fitted to an outer periphery of the boss portion, wherein the second gear is supported by the first gear in a centering manner by fitting the second fitting portion to the outer periphery of the boss portion, is connected with the first gear in a whirl stopping manner by a fastening device, and is supported by the shaft in whirl stopping and centering manners via the first gear, wherein the first fitting portion and the second fitting portion are overlapped with each other radially with respect to an axis of the shaft.

3. The gear supporting structure according to claim 2, further comprising:
   a first counter gear meshing with the first gear; and
   a second counter gear meshing with the second gear, wherein the second gear and the second counter gear are helical gears having helical teeth that are twisted in such a direction that a thrust force applied to the second gear acts as a pressing force applied to the first gear when a torque is transmitted from the second gear to the shaft via the first gear.

4. The gear supporting structure according to claim 1, wherein the second gear and the second counter gear are helical gears having helical teeth that are twisted in such a direction that a thrust force applied to the second gear acts as a pressing force applied to the first gear when a torque is transmitted from the second gear to the shaft via the first gear.

5. A hybrid driving unit, comprising:
   an engine-side drive gear drivingly connected with an engine;
   a motor-side drive gear drivingly connected with a motor;
   a counter shaft drivingly connected with wheels;
   an engine-side counter driven gear that meshes with the engine-side drive gear, that is supported by the counter shaft in whirl-stopping and centering manners, and that transmits power from the engine to the counter shaft;
   a motor-side counter driven gear that meshes with the motor-side drive gear, that is supported by the counter shaft in whirl-stopping and centering manners, and that transmits power from the motor to the counter shaft; and
   an axially extending boss portion formed in one of the counter driven gears with the other counter driven gear supported by the boss portion in whirl-stopping and centering manners and supported by the counter shaft in whirl-stopping and centering manners via the one of the counter driven gears.

6. The hybrid driving unit according to claim 5, wherein the one of the counter driven gears has a whirl-stop portion engaging the counter shaft and a first fitting portion fitted to the counter shaft, and is supported by the counter shaft in whirl-stopping and centering manners by engaging the whirl-stop portion with the counter shaft and fitting the first fitting portion to the counter shaft.

7. The hybrid driving unit according to claim 6, wherein the one of the counter driven gears is the motor-side counter driven gear and the other counter driven gear is the engine-side counter driven gear.

8. The hybrid driving unit according to claim 6, wherein the other counter driven gear has a second fitting portion fitted to an outer periphery of the boss portion of the one of the counter driven gears, is supported by the one of the counter driven gears in a centering manner by fitting the second fitting portion to the outer periphery of the boss portion, is connected with the one of the counter driven gears in a whirl-stopping manner by a fastening device, and is supported by the counter shaft in whirl-stopping and centering manners via the one of the counter driven gears.

9. The hybrid driving unit according to claim 8, wherein the one of the counter driven gears is the motor-side counter driven gear and the other counter driven gear is the engine-side counter driven gear.

10. The hybrid driving unit according to claim 8, wherein the first fitting portion and the second fitting portion are overlapped with each other radially with respect to an axis of the counter shaft.

11. The hybrid driving unit according to claim 10, wherein the one of the counter driven gears is the motor-side counter driven gear and the other counter driven gear is the engine-side counter driven gear.

12. The hybrid driving unit according to claim 8, wherein the hybrid driving unit is installed in a vehicle, and the other counter driven gear and the drive gear meshing therewith are helical gears having helical teeth that are twisted in such a direction that a thrust force applied to the other counter driven gear acts as a pressing force applied to the one of the counter driven gears during power running of the vehicle.

13. The hybrid driving unit according to claim 12, wherein the one of the counter driven gears is the motor-side counter driven gear and the other counter driven gear is the engine-side counter driven gear.

14. The hybrid driving unit according to claim 5, wherein the other counter driven gear has a second fitting portion fitted to an outer periphery of the boss portion of the one of the counter driven gears, is supported by the one of the counter driven gears in a centering manner by fitting the second fitting portion to the outer periphery of the boss portion, is connected with the one of the counter driven gears in a whirl-stopping manner by a fastening device, and is supported by the counter shaft in whirl-stopping and centering manners via the one of the counter driven gears.

15. The hybrid driving unit according to claim 14, wherein the one of the counter driven gears is the motor-side counter driven gear and the other counter driven gear is the engine-side counter driven gear.

16. The hybrid driving unit according to claim 6, wherein the first fitting portion and the second fitting portion are overlapped with each other radially with respect to an axis of the counter shaft.

17. The hybrid driving unit according to claim 16, wherein the one of the counter driven gears is the motor-side counter driven gear and the other counter driven gear is the engine-side counter driven gear.

18. The hybrid driving unit according to claim 14, wherein the hybrid driving unit is installed in a vehicle, and the other counter driven gear and the drive gear meshing therewith are helical gears having helical teeth that are twisted in such a direction that a thrust force applied to the other counter driven gear acts as a pressing force applied to the one of the counter driven gears during power running of the vehicle.

19. The hybrid driving unit according to claim 18, wherein the one of the counter driven gears is the motor-side counter driven gear and the other counter driven gear is the engine-side counter driven gear.

20. The hybrid driving unit according to claim 5, wherein the one of the counter driven gears is the motor-side counter driven gear and the other counter driven gear is the engine-side counter driven gear.

21. The gear supporting structure according to claim 1, wherein the first fitting portion and the second fitting portion are overlapped with each other radially with respect to an axis of the shaft.

* * * * *